Aug. 20, 1946.        E. F. FLINT         2,406,211
                      BUBBLE CELL
                  Filed Nov. 27, 1943

EDWARD F. FLINT
INVENTOR
BY
ATTORNEYS

Patented Aug. 20, 1946

2,406,211

UNITED STATES PATENT OFFICE 2,406,211

BUBBLE CELL

Edward F. Flint, Brighton, N. Y., assignor to Bausch & Lomb Optical Company, Rochester, N. Y., a corporation of New York Application November 27, 1943, Serial No. 511,987

3 Claims. (Cl. 33—212)

This invention relates to bubble levels, and more particularly to a means for automatically compensating for the thermal expansion of the liquid of the level.

Bubble levels of the type herein disclosed have long been used for establishing an artificial horizon in conjunction with instruments wherein it is desired to co-relate the position of a body with respect to the horizon, as for example in a navigating instrument such as the sextant or octant. The bubble level of the present invention is particularly adapted for use with such instruments.

As such instruments are subject to temperatures ranging from extreme cold as at high altitudes to the extremely warm temperature common to the tropics, the size of the bubble will vary due to expansion and contraction of the liquid of the level brought about by change in the ambient temperature.

This inherent difficulty has led to many proposed levels in which some means has been provided for compensating for the expansion and contraction of the liquid of the bubble chamber. The means in most of these prior proposals has consisted of a flexible walled reservoir chamber filled with the liquid such as used in the bubble chamber in communication therewith. Various means have been proposed for collapsing or expanding the reservoir chamber to change the volume of liquid in the bubble chamber and thus compensate for changes in the temperature. It has been found, however, that the continual distortion of the flexible walls of the reservoir chamber causes the same to deteriorate and crack, after which the liquid will leak out of the chambers and render the instrument useless.

The primary object of the present invention is to provide a liquid level in which the thermal expansion of the liquid is automatically compensated without resorting to the flexible walled chambers or reservoirs of the prior devices. In the broadest aspect of the present invention, this is accomplished by a compensating means comprising a reservoir chamber, the walls of which are rigid and formed of metallic materials having different thermal coefficients of expansion. The reservoir chamber is filled with the liquid of the bubble chamber and communicates therewith. As the thermal coefficients of expansion of the materials of the walls of the reservoir chamber are different, the size of the reservoir will automatically change as the temperature of the device changes.

The size of the reservoir chamber and the physical characteristics of the walls thereof relative to the size of the bubble chamber and the physical characteristics of the walls of the same are such that the change in size of the reservoir chamber is directly proportional over a wide temperature range to the change in the volume of the liquid held by the bubble chamber. Thus the volume of the liquid held by the bubble chamber will remain substantially constant over an extremely wide temperature range. As the volume of the liquid held by the bubble chamber remains substantially constant, the pressure on the bubble is substantially uniform and the size of the same will remain substantially constant.

Under some conditions it may be desirable to change the size of the bubble and to this end the one wall of the reservoir chamber is formed with an opening closed by a flexible diaphragm connected to an operating means for moving the diaphragm to increase or decrease the size of the reservoir chamber. The diaphragm is moved only when the size of the bubble is to be changed and consequently is not constantly distorted as are the flexible walls of prior devices. Thus the difficulty found in the prior flexible walls is obviated for with the exception of the one flexible wall the walls of the compensating reservoir are rigid and will not deteriorate in use.

Other features and advantages of the present invention will appear from the following description taken in connection with the accompanying drawing in which.

Figure 1:
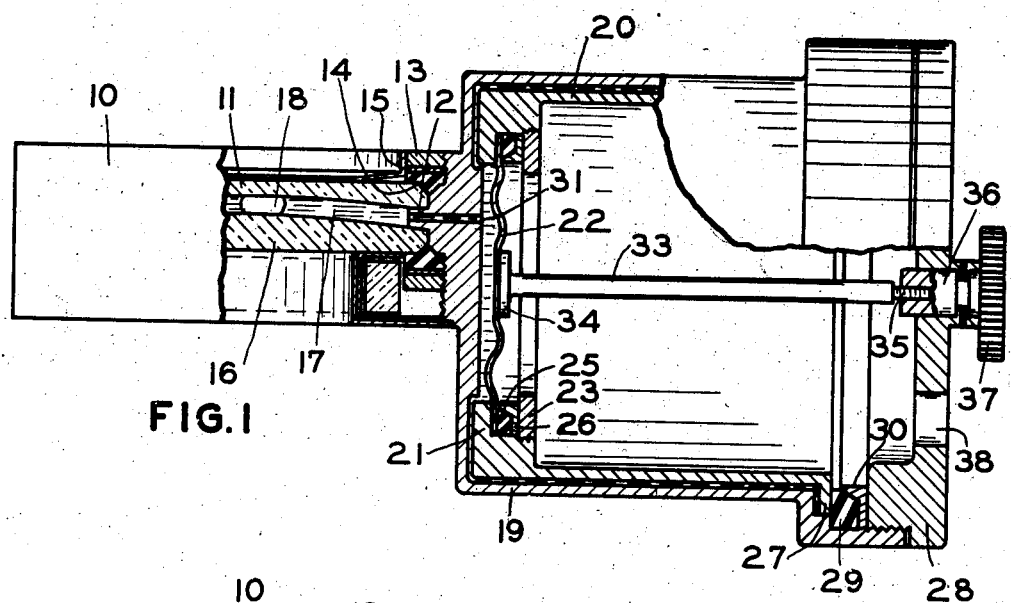
Fig. 1 is a sectional view, partly in elevation, of the bubble level of the present invention.
Figure 2:
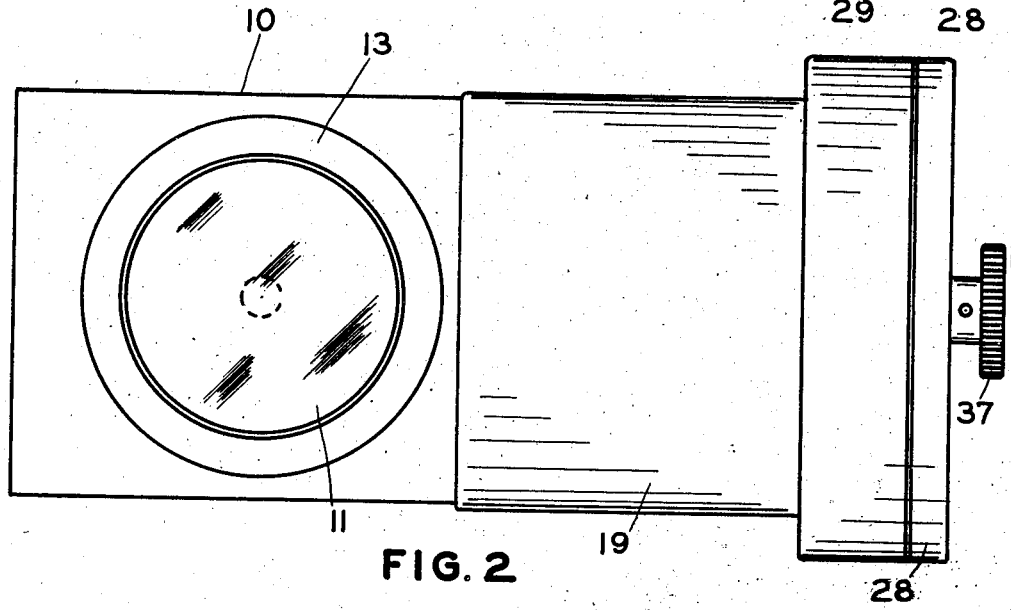
Fig. 2 is a top plan view of the bubble level embodying the present invention.

The new preferred embodiment of the device of the present invention referring now to the drawing, comprises a bubble level such as shown and described in my copending application, Serial #473,332 filed January 23, 1943. The bubble level comprises a housing 10 having a central opening extending therethrough. A transparent lens 11 is held against the upper face of an annular flange 12 extending inwardly of the wall of the opening by a locking ring 13 threaded into the upper end of the housing 10. A rubber gasket 14 and a retaining washer 15 seal the joint between the lens member 11 and the flange of the housing. A second transparent lens member 16 is held against the lower face of the flange 12 by a locking ring similar to the ring 13 and the joint between the lens 16 and the flange of the housing 10 is sealed by a gasket and retaining washer as is the lens 11.

The lens members 11 and 16 are, therefore, spaced apart a distance equal to the thickness of the flange 12 and there is thus formed between the two lens members a substantially horizontal chamber which in the embodiment of the invention now preferred forms the bubble chamber of the level for it contains a liquid 17 such as xylol in which is formed a bubble 18.

The housing 10 is integrally formed with a hollow cylindrical casing 19 laterally projecting therefrom and in which is mounted a substantially cup-shaped member 20. The transverse wall 21 of the member 20 is formed with an opening closed in the illustrated embodiment of the invention by a flexible diaphragm 22. The diaphragm 22 is held against the inner face of the wall 21 by a locking ring 23 and the joint between the diaphragm 22 and the wall 21 is sealed with a gasket 25 and a retaining washer 26.

The outer end of the casing 19 is formed with an enlarged bore forming a seat for taking an annular flange 27 of the member 20. The edge face of the flange 27 engages the inner surface of the large bore of the casing 19 and the flange 27 is held in place by means of an apertured cover or cap 28 threaded into the open end of the casing 19 to clamp a gasket 29 and a retaining ring 30 against the outer face of the flange 27.

The flange 27 centers the member 20 relative to the casing 19 and as the inner diameter of the casing 19 is somewhat larger than the outer diameter of the member 20 an annular space is provided between the casing 19 and the member 20. This annular space communicates with a circular space formed between the diaphragm 22 and the side wall of the housing 10, as the member 20 is somewhat shorter than the casing 19, and this latter space communicates with the bubble chamber through a passageway 31 formed in the side wall of the casing 10.

These just mentioned spaces form the reservoir chamber of the device of the present invention and are filled with the liquid 17 of the bubble chamber.

In the embodiment of the invention now preferred, the member 20 is formed of the alloy sold under the trade name "Invar" while the housing 10 and the casing 19 are formed of a stainless steel generally designated as "416 steel." The alloy "Invar" has a very low thermal coefficient of expansion while the thermal coefficient of expansion of stainless steel from which the casing 19 is formed is relatively high.

It will be seen that the inner wall of the reservoir chamber will remain substantially static upon a change in temperature of the device but that the outer wall will expand or contract depending upon the change of temperature. Thus, if the temperature decreases, the contraction of the outer wall will compress the liquid of the reservoir chamber and force additional liquid into the bubble chamber to compensate for the contraction of the walls of the chamber as well as the liquid therein. It will be understood that the size of the bubble chamber will also change as the material of the housing 10, as well as the lens 11 and 16, will also contract as the temperature decreases. On the other hand, should the temperature increase, the size of the reservoir chamber will also increase due to expansion of the casing 19 and the liquid will be pulled into the reservoir chamber to increase the volume therein and relieve the pressure on the bubble cell.

The size of the reservoir chamber and the physical characteristics of the walls thereof relative to the size of the bubble chamber and the physical characteristics of the stainless steel from which the walls are formed are such that the change in size of the reservoir chamber is directly proportional over a relatively wide range of temperature to the change in the volume of the liquid held by the bubble chamber. Thus, the pressure on the bubble formed in the liquid held by the bubble chamber will be negligible over an extremely wide temperature range and as the pressure remains substantially constant the size of the bubble will remain substantially constant.

It will thus be seen that the bubble of the level of the present invention will remain substantially unaffected by changes in temperature of the device. This is accomplished without resorting to the flexible walled chambers or reservoirs of the prior devices and consequently the life of the bubble level of the present invention is considerably greater than that of the prior devices. The expansion and contraction of the outer wall of the reservoir chamber of the bubble level of the present invention has little if any effect on the life of the wall for there is no actual flexing or bending of the wall as in the previously proposed devices in which the flexible walls of the reservoir chambers were actually distorted by the changes in the temperature.

Although the bubble will be formed and the size thereof regulated at the time the device is assembled, means are herein provided for manually changing the size of the bubble at will. This means in the illustrated form of the invention comprises a rod 33 having an enlarged head portion 34 connected in some suitable manner to the one surface of the flexible wall or diaphragm 22. The opposite end of the rod 33 is threaded as at 35 and engages the thread of a nut 36 rotatably mounted in the cover plate 28 but held against longitudinal movement relative to the rod. The nut 36 is formed with an enlarged operating knob 37 which is adapted to be manually grasped by a user and rotated to rotate the nut 36. It will be seen that upon rotation of the knob 37, the nut 36 will cause the rod 33 to move longitudinally of its own axis and move the flexible wall 22 to the left or right as viewed in Fig. 1 depending upon the direction of the rotation of the knob 37. This movement of the wall 22 will increase or decrease the volume of the reservoir chamber and, therefore, increase or decrease the pressure within the system to the end that the size of the bubble will be increased or decreased depending upon the direction of rotation of the knob.

It should be noted that the interior of the cup-shaped member 20 is open to the atmosphere as the cap 28 closing the open end thereof is formed with at least one aperture 38. Thus, any change in the temperature of the air filling the interior of the member 20 will not cause any change in the pressure of the air against the diaphragm or flexible wall 22.

This should now be understood for it will be seen that if the temperature of the air within the member should be increased, the air as it expanded would vent through the aperture 38. On the other hand, should the temperature of the air be decreased, the tendency of the cooled air to contract would be offset by the air drawn into the member through the aperture.

The air filling the interior of the cup-shaped member 20 tends to insulate the diaphragm 22 from the atmosphere so that the diaphragm is not subjected to changes in the temperature of the ambient atmosphere to the same extent as the casing 19. Furthermore, the contraction or expansion of the diaphragm 22 resulting from changes in temperature of the same has little, if any, effect on the life of the diaphragm.

The danger, therefore, of the diaphragm or flexible wall 22 failing in use is negligible for the same is only flexed when at infrequent intervals it may be desirable to change the size of the bubble. As the casing 19 will be the first to be affected by a change in the temperature of the ambient atmosphere, the contraction or expansion of the wall of the casing 19 will compensate for the contraction or expansion of the liquid and, therefore, relieve any pressure on the wall 22 which might be produced by the contraction or expansion of the liquid. Thus, the life of the diaphragm or wall 22 is not cut short by the continual changes in temperature which bubble levels are frequently subjected to in use.

Although the preferred embodiment of the present invention has been illustrated and described herein, it is to be understood that the invention need not be limited thereby but is susceptible of changes in form and detail within the scope of the appended claims.

I claim:

1. A liquid level comprising a bubble chamber; a second chamber communicating with said bubble chamber, said second chamber comprising rigid wall portions formed of materials having different coefficients of expansion; and a liquid filling said chambers, the differential of the coefficients of expansion of the materials of the wall portions increasing or decreasing the volume of the liquid held by said second chamber upon an increase or decrease in the temperature of the materials of the wall portions thereof; a flexible diaphragm closing and sealing an opening formed in one of said rigid wall portions; and means for flexing said diaphragm for manually changing the volume of said second chamber whereby the pressure of the liquid in the bubble chamber can be changed.

2. In a liquid level, a housing; a bubble chamber formed in said housing; a cylinder formed integral with said housing; said housing having a conduit leading from said bubble chamber to the interior of said cylinder; a substantially cup-shaped member nested in said cylinder; means for sealing the space formed between the inner wall of said cylinder and the outer wall of said member, the space forming a second chamber communicating with said bubble chamber; and a liquid filling said chambers, the cup-shaped member being formed of a material having a coefficient of expansion substantially smaller than that of the material of which the cylinder is formed so that a change in the temperature produces a change in the volume of said second chamber, one wall of said member having an opening therein; a flexible diaphragm closing said opening; and means for flexing said diaphragm for manually changing the volume of the liquid held by said second chamber.

3. A liquid bubble level comprising a housing; upper and lower transparent members horizontally mounted in said housing, said members being vertically spaced apart to provide a bubble chamber therebetween; a cylinder formed integral with said housing and projecting horizontally therefrom, said housing having a conduit leading from said chamber to the interior of said cylinder; a substantially cup-shaped member having an opening formed in a wall thereof, a flexible diaphragm closing and sealing said opening, said member having a diameter less than the inner diameter of said cylinder and disposed within the same; means for sealing the space formed between the inner wall of said cylinder and the outer wall of said member, the space forming a second chamber communicating with said bubble chamber; and a liquid filling said chambers, a bubble in the liquid of said bubble chamber; the cup-shaped member being formed of a material having a coefficient of expansion substantially smaller than that of the material of which the cylinder is formed so that a change in the temperature produces a change in the size of said second chamber and the volume of the liquid held thereby whereby the size of the bubble remains substantially constant over a relatively wide temperature range; and a means for flexing the diaphragm for manually changing the volume of the liquid in said second chamber whereby the pressure of the liquid held by said bubble chamber can be changed to change the size of the bubble.

EDWARD F. FLINT.